(12) United States Patent
Stoschek et al.

(10) Patent No.: US 7,498,768 B2
(45) Date of Patent: Mar. 3, 2009

(54) KEY FOR A VEHICLE

(75) Inventors: Arne Stoschek, Palo Alto, CA (US);
Rizwan Ahmed, Stanford, CA (US)

(73) Assignee: Volkswagen Aktiengesellschaft, Wolfsburg (DE)

( * ) Notice: Subject to any disclaimer, the term of this patent is extended or adjusted under 35 U.S.C. 154(b) by 426 days.

(21) Appl. No.: 11/047,160

(22) Filed: Jan. 31, 2005

(65) Prior Publication Data
US 2005/0166651 A1   Aug. 4, 2005

Related U.S. Application Data

(60) Provisional application No. 60/541,788, filed on Feb. 4, 2004.

(51) Int. Cl.
H02J 7/00 (2006.01)
(52) U.S. Cl. ........................ 320/108; 320/138
(58) Field of Classification Search .......... 320/101, 320/107, 108, 138; 290/1 E, 1 R; 322/3
See application file for complete search history.

(56) References Cited

U.S. PATENT DOCUMENTS

| 4,585,144 | A | 4/1986 | Granzow et al. ........... 221/7 |
| 6,485,172 | B1 | 11/2002 | Takahashi et al. ......... 368/148 |
| 6,954,025 | B2 * | 10/2005 | Nishida et al. ............. 310/339 |
| 2002/0109582 | A1 * | 8/2002 | Mooney et al. ............ 340/5.65 |
| 2005/0101045 | A1 * | 5/2005 | Shih et al. .................. 438/48 |

FOREIGN PATENT DOCUMENTS

| DE | 2750634 | | 5/1979 |
| DE | 2914153 | | 10/1980 |
| DE | 3906861 | | 9/1989 |
| DE | 4117547 | | 12/1992 |
| DE | 4117547 | A * | 12/1992 |
| DE | 19918817 | C * | 9/2000 |
| EP | 406978 | A * | 1/1991 |
| EP | 0738812 | | 10/1996 |

OTHER PUBLICATIONS

An oral english translation for Fennel (DE 4117547 A), col. 2, lines 4-7 was provided to the examiner by the translator, John Koytcheff on Sep. 19, 2007 and should be attached.*
Enflish Translation for Fennel (DE 4117547).*
Bergmann, Neil W.; Interfacing requirements for MEMS components in system-on-chip methodologies; School of Computer Science and Electrical Engineering, The University of Queensland.

* cited by examiner

Primary Examiner—Akm E Ullah
Assistant Examiner—Ramy Ramadan
(74) Attorney, Agent, or Firm—Baker Botts L.L.P.

(57) ABSTRACT

A key (1, 40) for a vehicle (10, 50), in which the key (1, 40) includes a battery (21) to store electrical power further comprises a generator (23) to convert mechanical energy to electrical energy, wherein the battery (21) is chargeable by means of power generated by the generator (23).

10 Claims, 3 Drawing Sheets

KEY FOR A VEHICLE

PRIORITY

This application claims priority to and is converted from U.S. Provisional Application 60/541,788 filed Feb. 4, 2004.

TECHNICAL FIELD OF THE INVENTION

The present invention relates to a key for a vehicle, in which the key includes a battery to store electrical power.

DESCRIPTION OF THE RELATED ART

This type of key is known from DE-OS 27 50 634, DE 41 17 547 A1 and DE-OS 29 14 153. DE-OS 27 50 634 discloses an ignition key of a vehicle with a metal shaft contained in an insulating element. A nickel-cadmium battery is arranged within the insulating element as current collector, as well as an incandescent lamp supplied from it. The insulating element also has a mounting eye, as well as a pushbutton designed as a closer, through which the circuit between the current collector and the incandescent lamp can be closed. An electrical line leads from the metal shaft to a connection of the current collector. The metal shaft also has a connection insulated from it by insulating material that extends over its width and leads to the other connection of the current collector via a protective resistor.

DE 41 17 547 A1 discloses an ignition key for vehicles with a rechargeable electrical accumulator, for example, a small battery. After insertion of the ignition key in a corresponding ignition lock, this battery is connected to the power supply of the vehicle via a contact arranged in the ignition lock and a charge device. An illumination device and/or miniature heating element for door lock deicing and/or a remote control transmitter are incorporated in the ignition key or in the handle.

DE-OS 27 50 634 discloses an illuminated key, which can be made to illuminate in the darkness by means of thumb pressure, in which the illuminated key consists of a metal key and a plastic handle on its rear end, which accommodates all the functional parts required to make an also incorporated miniature incandescent bulb illuminate. The illuminated key is equipped with a mini battery and can be recharged via a plug-in connection possibility, also incorporated in the handle.

An electrical connection between a key and a vehicle is also known from EP 0 738 812 A1.

SUMMARY OF THE INVENTION

The task of the invention is to improve keys for vehicles, especially ignition keys with a remote control, disclosed, for example, in DE 41 17 547 A1.

The aforementioned task is solved by a key for vehicle, in which the key has a battery to store electrical power and a generator to convert mechanical energy to electrical power. In an advantageous embodiment of the invention, the battery is then chargeable by means of energy that can be generated by the generator. A practical example of such a generator can be gathered from DE 39 06 861 A1. In a particularly advantageous embodiment of the invention, the generator, however, is implemented on an MEMS chip.

In another advantageous embodiment of the invention, the key has an electrical contact to produce a conducting connection with an electrical power supply to the vehicle, so that the battery is chargeable by the electrical power supply to the vehicle.

In another advantageous embodiment of the invention, the key has a mechanical winding device to convert motion energy, for example, vibrations, to mechanical energy for the generator. The mechanical winding device is then implemented on the same MEMS chip as the generator.

In another advantageous embodiment of the invention, the mechanical winding device includes an energy accumulator to store mechanical energy. Such an energy accumulator for storage of mechanical energy can be a spring.

In another advantageous embodiment of the invention, the key has a receiver to produce an inductive connection with an electrical power supply to the vehicle, so that the battery can be charged by the electrical power supply of the vehicle.

A vehicle according to the invention is, in particular, a ground vehicle, usable individually in traffic. Vehicles according to the invention are not particularly restricted to ground vehicles with an internal combustion engine.

BRIEF DESCRIPTION OF THE DRAWINGS

Additional advantages and details are apparent from the following description and practical examples. In this case.

DETAILED DESCRIPTION OF THE PREFERRED EMBODIMENTS

Figure 1:
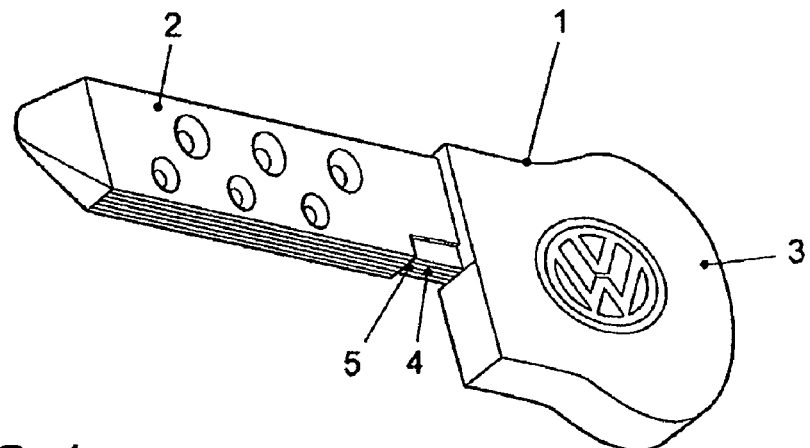
FIG. 1 shows a practical example of an ignition key.
Figure 2:
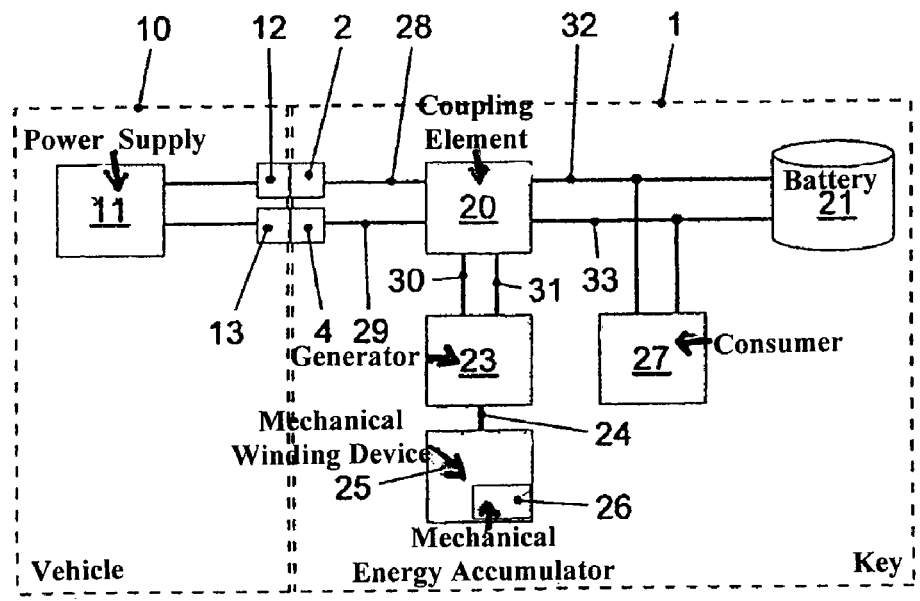
FIG. 2 shows a schematic view of a vehicle and an ignition key allocated to the vehicle.

FIG. 1 shows an ignition key for a vehicle with a metal closure part 2 for mechanically occurring locking and/or unlocking or a door of the vehicle and/or for operation of the vehicle. FIG. 2 shows a schematic view of a vehicle 10 and the ignition key 1 allocated to the vehicle.

The closure part 2 is connected to a housing 3, consisting essentially of plastic. The closure part 2 has a recess 5, in which an electrical contact 4 is arranged to produce an electrically-conducting connection with an electrical power supply 11 of vehicle 10. The metal closure part 2 serves as second conducting contact. The vehicle 10 has corresponding electrical contacts 12 and 13, by means of which an electrically-conducting connection can be made with the metallic closure part 2 and the electrical contact 4.

Figure 3:
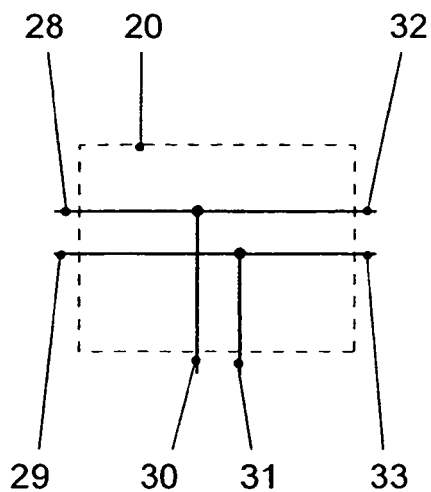
FIG. 3 shows a simple practical example of a coupling element.

The metallic closure part 2 and the contact 4 are connected to a coupling element 20 via feed lines 28 and 29. The coupling element 20, for example, can be a simple electrical connection, as shown in FIG. 3. The coupling element 20, however, can also be a circuit, having diodes that disconnect the feed lines 28, 29, 30 and 31 from each other and relative to tap lines 32 and 33 and permit current flow only in one direction.

The key 1 also includes a battery 21 to store electrical power, which can be fed to and taken from battery 21 via tap lines 32 and 33. A charging circuit (not shown) can be allocated to battery 21. The key 1 also includes a generator 23 to convert mechanical energy to electrical energy, in which the battery 21 is chargeable by means of electrical power that can be generated by generator 23. This type of generator 23 for use in very small mobile units, like a key, is disclosed in different variants in DE 39 06 861 A1 (incorporated by reference). With reference to the details of generator 23, DE 39 06 861 A1 is referred to. In a particularly advantageous embodiment of the invention, however, is implemented on an MEMS chip. Details of an MEMS chip can be gathered, for example, from the article "Interfacing requirements for MEMS components in system-on-chip methodologies" by N. W. Bergmann, available under the Internet address www.itee.uq.edu.au/~bergmann/Research/Online%20Publications/MicroMems01.pdf.

The key 1 also has a mechanical winding device 25 to convert energy of motion, for example, vibrations, to mechanical energy by movement of the generator 23 over a mechanical coupling 24. This type of mechanical winding device 25 can include a mechanical energy accumulator 26, like a spring. Particularly suitable embodiments for the mechanical winding device 25 are mechanical winding devices as used for wristwatches. Examples of such mechanical winding devices can be gathered from EP 1 136 891 A1 (incorporated by reference) and EP 1 041 458 A1 (incorporated by reference), to which reference is made concerning the details of mechanical winding device 25. In a particularly advantageous embodiment of the invention, the mechanical winding device 25, the mechanical coupling 24 and the generator 23 (and optionally the mechanical energy accumulator 26) are implemented on an MEMS chip.

A consumer 27 can be supplied with electrical power via tap lines 32 and 33. This type of consumer 27 can be an illumination device and/or a miniature heating element for door lock deicing and/or a remote control transmitter.

Figure 4:
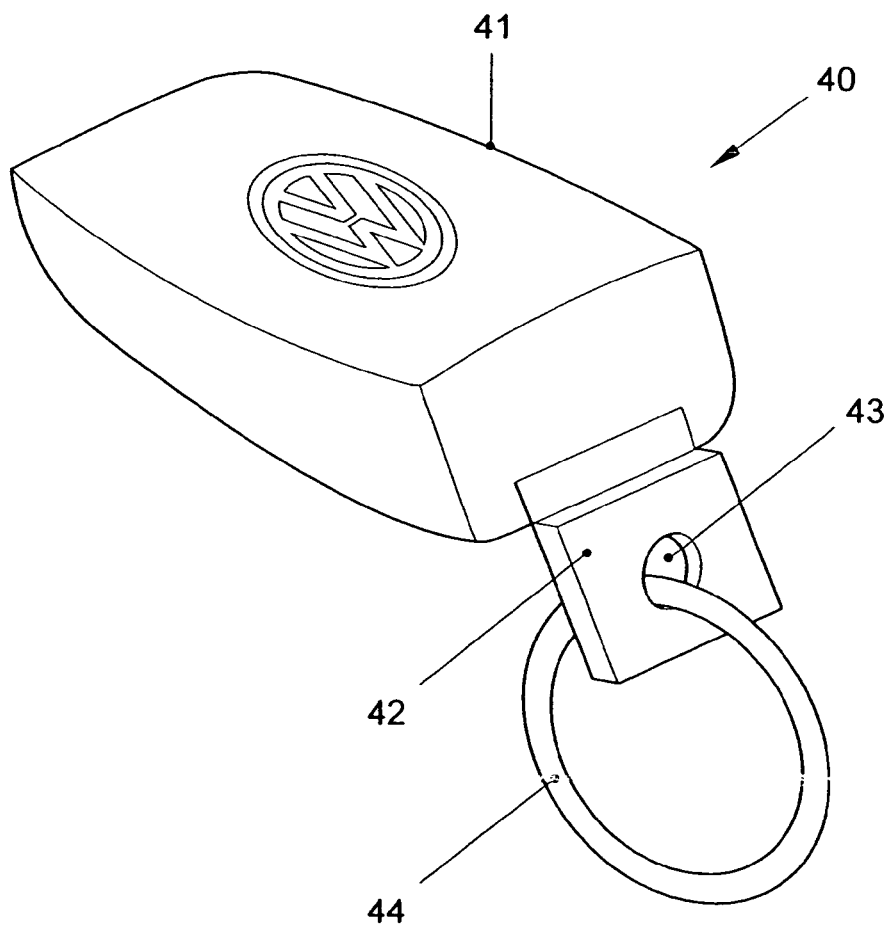
FIG. 4 shows another practical example of a key.
Figure 5:
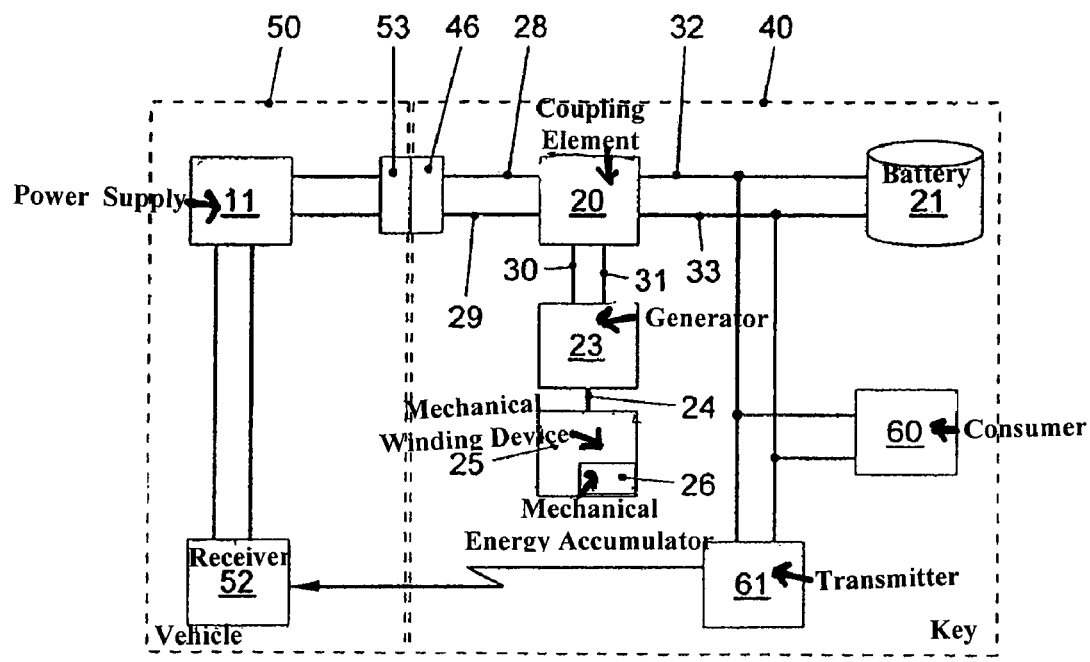
FIG. 5 shows a schematic view of a vehicle and an additional practical example of a key allocated to the vehicle.

FIG. 4 shows another practical example of an ignition key 40, and FIG. 5 shows a schematic view of a vehicle 50 and the ignition key 40 allocated to vehicle 50, in which the same reference numbers denote the same or equivalent elements as in FIG. 2. The ignition key 40 includes a transmitting electronics 61, cooperating with a receiving electronics 52 arranged in vehicle 50, arranged in a housing 41 for contactless locking and/or unlocking of a door of vehicle 50 and/or for operation of vehicle 50, as well as an emergency key 42 for mechanically occurring locking and/or unlocking of the door of the vehicle 50 and/or for operation of the vehicle 50. The emergency key 42 is fully or partially accommodated in housing 41 and can be locked in at least two different positions. The emergency key 42 has an opening 43, into which, as shown in FIG. 4, a key ring 44 can be threaded.

The transmitting electronics 61 for contactless locking and/or unlocking of a door of the vehicle 50 and/or for operation of the vehicle 50, as well as an optional additional consumer 60, are, like the consumer 27 according to FIG. 2, suppliable with electrical power via the lines designated tap lines 32 and 33. To obtain this electrical power, the key 40, in addition to a generator 23, has a receiver 46 to produce an inductive connection with an electrical power supply 11 of vehicle 50 via an inductive transmitter 53, so that the battery 21 can be charged by the electrical power supply 51 of vehicle 50.

It can be prescribed that the inductive transmitter 53 and receiving electronics 52 are implemented as common hardware. It can also be proposed, or as an alternative, that the transmitting electronics 61 and the receiver 42 are implemented as common hardware.

We claim:

1. A key for a vehicle, in which the key comprises a battery for storage of electrical power, a generator to convert mechanical energy to electrical energy, an electrical contact to produce a connection with an electrical power supply of the vehicle, and a coupling device for coupling the battery with the generator and the electrical contact for charging the battery by the generator and/or the electrical power supply of the vehicle wherein the coupling device comprises diodes for de-coupling the generator from the electrical contact.

2. The key according to claim 1, wherein the key has a mechanical winding device to convert energy of motion to mechanical energy for the generator.

3. The key according to claim 2, wherein the mechanical winding device includes an energy accumulator to store mechanical energy.

4. The key according to claim 1, wherein the generator is implemented on an MEMS chip.

5. The key according to claim 4, wherein a mechanical winding device is implemented on the MEMS chip.

6. A key for a vehicle, comprising:
a battery for storage of electrical power,
a generator to convert mechanical energy to electrical energy coupled with the battery,
a receiver to produce an inductive connection with an electrical power supply of the vehicle, and
a coupling device for coupling the battery with the generator and the receiver for charging the battery by the generator and/or the electrical power supply of the vehicle wherein the coupling device comprises diodes for de-coupling the generator from the receiver.

7. The key according to claim 6, wherein the key has a mechanical winding device to convert energy of motion to mechanical energy for the generator.

8. The key according to claim 7, wherein the mechanical winding device includes an energy accumulator to store mechanical energy.

9. The key according to claim 6, wherein the generator is implemented on an MEMS chip.

10. The key according to claim 9, wherein a mechanical winding device is implemented on the MEMS chip.

* * * * *